United States Patent
Lu

(10) Patent No.: US 7,401,328 B2
(45) Date of Patent: Jul. 15, 2008

(54) SOFTWARE-IMPLEMENTED GROUPING TECHNIQUES FOR USE IN A SUPERSCALAR DATA PROCESSING SYSTEM

(75) Inventor: John Lu, Plano, TX (US)

(73) Assignee: LSI Corporation, Milpitas, CA (US)

( * ) Notice: Subject to any disclaimer, the term of this patent is extended or adjusted under 35 U.S.C. 154(b) by 669 days.

(21) Appl. No.: 10/739,742

(22) Filed: Dec. 18, 2003

(65) Prior Publication Data

US 2005/0138607 A1    Jun. 23, 2005

(51) Int. Cl.
G06F 9/45 (2006.01)
G06F 15/00 (2006.01)
G06F 7/38 (2006.01)

(52) U.S. Cl. ............... 717/159; 717/151; 712/23; 712/231; 712/245

(58) Field of Classification Search ......... 717/151–161; 712/12, 23, 231, 245
See application file for complete search history.

(56) References Cited

U.S. PATENT DOCUMENTS

| | | | | |
|---|---|---|---|---|
| 4,965,724 A * | 10/1990 | Utsumi et al. | ............ | 717/160 |
| 5,119,495 A * | 6/1992 | King | ............ | 717/153 |
| 5,450,605 A * | 9/1995 | Grochowski et al. | ............ | 712/23 |
| 5,500,942 A * | 3/1996 | Eickemeyer et al. | ............ | 712/210 |
| 5,560,028 A | 9/1996 | Sachs et al. | | |
| 5,794,003 A | 8/1998 | Sachs | | |
| 5,812,810 A * | 9/1998 | Sager | ............ | 712/216 |
| 5,889,999 A * | 3/1999 | Breternitz et al. | ............ | 717/158 |
| 5,930,489 A * | 7/1999 | Bartkowiak et al. | ............ | 712/200 |
| 6,006,033 A * | 12/1999 | Heisch | ............ | 717/158 |
| 6,032,251 A * | 2/2000 | Tran et al. | ............ | 712/216 |
| 6,099,585 A * | 8/2000 | Godfrey | ............ | 717/154 |
| 6,292,884 B1 * | 9/2001 | Tran et al. | ............ | 712/216 |
| 6,360,313 B1 | 3/2002 | Sachs et al. | | |
| 6,694,435 B2 * | 2/2004 | Kiddy | ............ | 713/189 |
| 6,799,262 B1 * | 9/2004 | Blandy et al. | ............ | 712/200 |
| 6,813,702 B1 * | 11/2004 | Ramey et al. | ............ | 712/23 |
| 6,892,293 B2 * | 5/2005 | Sachs et al. | ............ | 712/215 |
| 7,039,791 B2 * | 5/2006 | Sachs et al. | ............ | 712/215 |

OTHER PUBLICATIONS

Jouppi et al., "Available Instruction-Level Parallelism for Superscalar and Superpipelined Machines," 1989, ACM, p. 272-282.*
Nair et al., "Exploiting Instruction Level Parallelism in Processors by Caching Scheduled Groups," 1997, ACM, p. 13-25.*
Schneider et al., "Pipeline Behavior Prediction for Superscalar Processors by Abstract Interpretation," 1999, ACM, p. 35-44.*
Stark et al., "On Pipelining Dynamic Instruction Scheduling Logic," 2000, ACM, p. 1-10.*

* cited by examiner

Primary Examiner—Wei Y. Zhen
Assistant Examiner—Qing Chen
(74) Attorney, Agent, or Firm—Mike Bush PLLC

(57) ABSTRACT

A data processing system includes a grouping tool coupled to a processor. The grouping tool groups the stream of instructions such that each group of instructions has a dimensionless signature annotated thereto. An instruction prefetch unit of the processor fetches the stream of grouped instructions from a memory in the processor and an instruction issue logic unit of the processor identifies boundaries between the groups of instructions by executing a signature detection algorithm. In one embodiment, the data processing system includes a pipelined superscalar processor core and is capable of concurrently executing multiple instructions in the same or different pipeline stages.

48 Claims, 4 Drawing Sheets

SOFTWARE-IMPLEMENTED GROUPING TECHNIQUES FOR USE IN A SUPERSCALAR DATA PROCESSING SYSTEM

FIELD OF THE INVENTION

This invention relates generally to data processing, and, more particularly, to software-implemented techniques for grouping of multiple instructions in a superscalar processor architecture.

BACKGROUND OF THE INVENTION

A typical processor fetches or otherwise receives instructions from an external memory for subsequent execution or otherwise processing thereof. In general, instruction execution involves an address operation and/or a data operation, wherein the address operation produces an address value, typically, an address for a location in a memory, and the data operation produces a data value. Most instructions specify operations to be performed using one or more operands. An operand may be specified using one of several different types of addressing modes and may be included in the instructions themselves, or reside in either a register in the processor or in an external memory coupled to the processor.

Many modern processors employ a technique called pipelining to execute more software program instructions (instructions) per unit of time. In general, processor execution of an instruction involves fetching the instruction (e.g., from a memory system), decoding the instruction, obtaining needed operands, using the operands to perform an operation specified by the instruction, and saving a result. In a pipelined processor, the various steps of instruction execution are performed by independent units of the processor commonly referred to as pipeline stages. In the pipeline stages, corresponding steps of instruction execution are performed on different instructions independently, and intermediate results are passed to successive pipeline stages. By permitting the processor to overlap the executions of multiple instructions, pipelining allows the processor to execute more instructions per unit of time.

In general, a "scalar" processor issues instructions for execution one at a time while a "superscalar" processor is capable of issuing multiple instructions for execution at the same time. A pipelined scalar processor concurrently executes multiple instructions in different pipeline stages; the executions of the multiple instructions being overlapped in the manner described above. A pipelined superscalar processor, on the other hand, concurrently executes multiple instructions in different pipeline stages, and is also capable of concurrently executing multiple instructions in the same pipeline stage. Examples of pipelined superscalar processors include the popular Intel® Pentium® processors (Intel Corporation, Santa Clara, Calif.) and IBM® PowerPC® processors (IBM Corporation, White Plains, N.Y.).

A superscalar processor requires the grouping of multiple instructions to determine which instructions can be issued concurrently for execution at the same time. This grouping of multiple instructions increases the complexity of the grouping hardware required in the above-described processor. In a superscalar processor, the grouping of multiple instructions may be implemented by annotating grouping information into the instruction stream. Currently there are two techniques for annotating grouping information, the first known as a "grouping-bit annotation" technique and the second being known as an "end-of-group annotation" technique. The grouping-bit annotation technique reserves a bit in every instruction to mark that instruction as the end of the group. Because it reserves a bit in every instruction to denote whether or not that instruction is the end of a group, the grouping bit annotation technique makes instruction encodings less efficient. Conversely, the shortcoming of the end of group annotation technique is that the technique adds an extra instruction to each group of instructions to denote the end of that group. It would therefore be beneficial to provide an alternative way to annotate the grouping of multiple instructions in a superscalar processor without either reserving a bit within each instruction or adding additional instructions to the instruction stream.

SUMMARY OF THE INVENTION

A data processing system includes a processor which receives a stream of grouped instructions and implements an instruction execution pipeline using the received stream of grouped instructions. The stream of grouped instructions are generated by a grouping tool, implemented in software, which arranges a stream of instructions into the stream of grouped instructions. Typically, the grouping tool resides within an assembler coupled to a system on a chip (SOC) on which the processor resides.

In one implementation thereof, the processor includes an instruction prefetch unit for fetching the stream of grouped instructions from memory and an instruction issue logic unit configured to identify the groups of instructions contained in the fetched stream of grouped instructions. The grouping tool rearranges the stream of instructions into groups by annotating each group of instructions with a dimensionless signature. The groups are subsequently identified by recognition of the dimensionless signature by the processor. A dimensionless signature is annotated onto each group by reordering instructions within the group so that the end of the group can be recognized with a predefined pattern of values among the instructions. Various relationships including a first stop-loss relationship and a last stop-loss relationship are suitable for use as the predefined pattern.

These and other aspects of the invention may be appreciated from the following description, accompanying drawings and claims.

BRIEF DESCRIPTION OF THE DRAWINGS

The invention may be understood by reference to the following description taken in conjunction with the accompanying drawings, in which like reference numerals identify similar elements, and in which.

DETAILED DESCRIPTION

In the following disclosure, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Furthermore, the foregoing description omits various details which are believed to not be necessary to obtain a complete understanding of the present invention and/or are considered to be within the understanding of persons of ordinary skill in the relevant art.

Certain terms are used throughout the following description and claims to refer to particular system components. As one skilled in the art will appreciate, components may be referred to by different names. This document does not intend to distinguish between components that differ in name, but not function. Also, in the following description and claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections. Finally, it should be noted that, unless specifically indicated otherwise, all functions set forth in the following description and claims may be performed in hardware, software, or a combination thereof.

Figure 1:
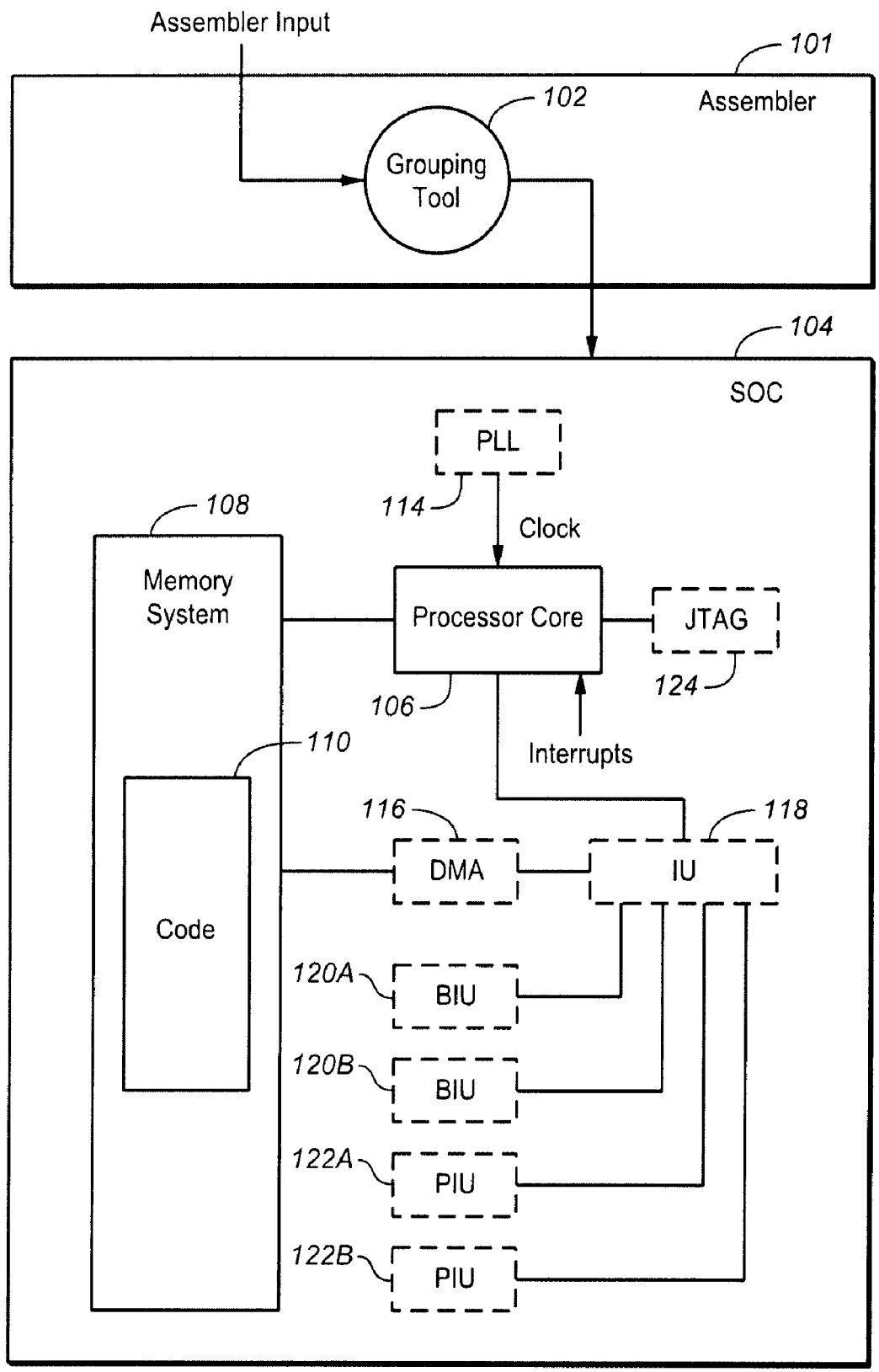
FIG. 1 is a block diagram of one embodiment of a data processing system including a grouping tool coupled to a system on a chip (SOC) having a processor core coupled to a memory system.

FIG. 1 is a diagram of one embodiment of a data processing system 100 constructed in accordance with the teachings of the present invention. As may now be seen, the data processing system 100 includes an assembler 101 for providing a program or code to a "system-on-a-chip" (SOC) 104. As may be seen in FIG. 1, the assembler 101 includes a grouping tool 102 implemented in software. Of course, it should be clearly understood that, as illustrated in FIG. 1, the assembler 101 has been greatly simplified and numerous functions performed thereby have been omitted for ease of description. Input to the grouping tool 102 is a stream of assembly instructions. As will be more fully described below, the grouping tool 102 executes a signature annotation algorithm on the stream of assembly instructions input thereto. Briefly, however, the signature annotation algorithm executed by the grouping tool 102 adds grouping information to the stream of assembly instructions so that boundaries for groups of instructions may be subsequently identified and processed by the SOC 104. Importantly, the signature annotation algorithm executed by the grouping tool 102 is capable of annotating each group of instructions processed thereby with a signature which, because, it neither lengthens the instruction stream, for example, by adding additional instructions or tags to the instruction stream to identify groups of instructions within the stream, nor reserves a portion of the existing instruction stream, for example, by reserving a bit within each instruction to denote whether the instruction is the end of a group of instructions within the stream, may be deemed to be a dimensionless signature. Upon receiving the annotated stream of instructions from the grouping tool 102, the SOC 104 first identifies groups of instructions within the annotated stream of instructions by recognizing the signatures annotated thereto and then executes the identified groups of instructions contained within the received instruction stream.

While the SOC 104 may be variously configured, as illustrated in FIG. 1, the SOC includes a processor core 106 coupled to a memory system 108. The processor core 106 is both a "processor" and a "core." The term "core" is merely used to refer to the fact that the processor core 106 is a functional block or unit of the SOC 104. More specifically, it is now possible for integrated circuit designers to take highly complex functional units or blocks, such as processors and integrate them into an integrated circuit much like other, less complex, building blocks. For example, as shown in phantom in FIG. 1, in addition to the processor core 106, the SOC 104 may include one or more of a phase-locked loop (PLL) circuit 114, a direct memory access (DMA) circuit 116, bus interface units (BIUs) 120A and 120B, peripheral interface units (PIUs) 122A and 122B and/or a Joint Test Action Group (JTAG) circuit 124. As each of these components is commonly known in the art, a detailed description of their operation is unnecessary. Briefly, however, the PLL circuit 114 generates a CLOCK signal used to control operations of the processor core 106. The DMA circuit 116 enables access to the memory system substantially independently of the processor core 106. The BIUs 120A and 120B are used to couple external buses (not shown). Similarly, the PIUs 122A and 122B couple the processor core 106 to external peripheral devices (also not shown). The IU 118 is used to form an interface between the BIUs 120A and 120B and/or the PIUs 122A and 122B and the processor core 106 and, if present, the DMA circuit 116. Finally, the JTAG circuit 124 is an IEEE Standard 1169.1 compatible boundary scan access port for circuit-level testing of the processor core 106. Of course, the present disclosure of a "processor core" to execute groups of instructions contained in an annotated stream of instructions should not be interpreted as implying or suggesting that the techniques disclosed herein cannot be executed by other types of processors, for example, processors which do not share an SOC with other components.

In general, the memory system 108 stores data, wherein the term "data" is understood to include instructions, for example, the stream of assembly instructions initially received by the grouping tool 102. In the embodiment illustrated in FIG. 1, the memory system 108 stores a software program or code 110 which includes the annotated stream of assembly instructions passed from the grouping tool 102 to the SOC 104. As will be more fully described below, the processor core 106 fetches instructions forming part of the code 110 from the memory system 108 and subsequently executes the instructions fetched from the memory system 108. The fetching and subsequent execution of the grouped instructions retrieved from the memory system 108 are controlled by a clock input to the processor core 106. In the embodiment illustrated in FIG. 1, the PLL circuit 114 generates the clock input. Of course, other clock sources would be equally suitable for the uses contemplated herein. In the embodiment illustrated in FIG. 1, the annotated instruction stream retrieved from the memory system 108 includes instructions involving address and/or data operations as described above, wherein an address operation produces an address value, typically, an address of a memory location in the memory system 108, and a data operation produces a data value. The annotated instruction stream also includes instructions specifying operands via the register indirect with index register addressing mode, wherein the contents of two registers are added together to form an address of a memory location in the memory system 108, and the operand is obtained from the memory location using the address.

Continuing to refer to FIG. 1, the signature annotation algorithm executed by the grouping tool 102 will now be described in greater detail. A conventionally configured assembler would generate a stream of non-annotated assembly instructions for transmission to an SOC or other type of processor from programming code, input the assembler, by a programmer. Unlike a conventionally configured assembler, however, the assembler 101 includes the grouping tool 102 which annotates the stream of assembly instructions generated by the assembler 101 before it is transmitted to the SOC 104. Apart from the inclusion of the grouping tool 102 therein, the assembler 101 operates in a conventional manner. Accordingly, neither a description of the other components forming part of the assembler 101 nor a detailed description of the various functions performed by the assembler 101 is necessary for an understanding of the present invention. Thus, in accordance with the teachings of one embodiment, assembler input, typically, programming code, is input the assembler 101 by a programmer. Using the programming code input thereto, the assembler 101 constructs a stream of assembly instructions suitable for transmission to the SOC 104. As part of the construction of the stream of assembly instructions, the grouping tool 104 annotates the stream of assembly instructions such that the output of the assembler 104 transmitted to the SOC 104 is a stream of annotated instructions. In this regard, it is noted that a variety of functions also occur within the assembler 101 and it is specifically contemplated that annotation of the stream of assembly instructions may occur at various times relative to these other functions. It should also be noted that, heretofore, grouping of instructions were performed by the processor core 106 residing on the SOC 104. By moving the grouping function off of the SOC 104 to a location where it may be implemented in software, the hardware requirements for the processor core 106 have been simplified greatly.

The stream of assembly instructions is annotated by the grouping tool 104 executing a signature annotation algorithm. By executing a signature annotation algorithm which exploits permissible flexibility in ordering of the received instructions, information identifying groupings of instructions within an instruction stream may be added to the instruction stream without adding to the length of the instruction stream itself. In accordance with one embodiment of the signature annotation algorithm executed by the grouping tool 102, the grouping tool 102 annotates each group with a first stop-loss signature without adding to the length of the group itself. Generally, if the value (val) of a candidate instruction (CI) is X when the instruction is interpreted as an unsigned integer, a first stop-loss signature will reorder an n-instruction group such that: (1) the value of candidate instruction $CI_0$ is less than or equal to the value of candidate instruction $CI_j$ for j=1 through j=n–2; and (2) the value of candidate instruction $CI_0$ is greater than the value of candidate instruction $CI_{n-1}$. In other words, a first stop-loss signature annotation algorithm will order an n-instruction group such that:

$$\text{val}(CI_0) <= \text{val}(CI_j) \text{ for } j=1 \text{ to } n-2; \text{ and} \quad (1)$$

$$\text{val}(CI_0) > \text{val}(CI_{n-1}). \quad (2)$$

Once a group of instructions are reordered by the signature annotation algorithm residing within the grouping tool 102 such that the reordered group of instructions, also referred to as "candidate instructions", which includes a non-space consuming, identifying signature appended thereto, the instruction stream containing the grouped candidate instructions are passed from the grouping tool 102 to the processor core 106 for subsequent processing of the candidate instructions in a manner to be more fully described below. Briefly, however, the processing will include execution of a signature detection algorithm residing within the processor core 106 which will enable the processor core 106 to identify which instructions are included in a particular group of candidate instructions. In this regard, it should be noted that the signature detection algorithm performed on the candidate instructions will vary depending on certain characteristics of the signature annotation algorithm executed by the grouping tool 102 to produce the candidate instructions. For example, one type of signature annotation, specifically, a first stop-loss signature, has already been described briefly. A second type of signature annotation, specifically, a last stop-loss signature, shall be described later. For each of these types of signature annotation, the processor core 106 would need to execute a distinct signature detection algorithm.

To further explain the operation of the grouping tool 102, an example of the execution of the signature annotation algorithm when the signature annotation algorithm is configured to annotate a group of instructions with a first stop-loss signature will now be more fully described. In the following example, the signature annotation algorithm reorders a group of five instructions having the following values: $I_0$=1000; $I_1$=2000; $I_2$=3000; $I_3$=4000; and $I_4$=5000. By executing the first stop-loss signature annotation algorithm, the grouping tool 102 maps the initial group of five instructions in accordance with Table I below:

TABLE I

| Instruction No. | Value of Instruction | Candidate Instruction | Value of Candidate Instruction |
| --- | --- | --- | --- |
| $I_0$ | 1000 | $CI_4$ | 1000 |
| $I_1$ | 2000 | $CI_0$ | 2000 |
| $I_2$ | 3000 | $CI_2$ | 3000 |
| $I_3$ | 4000 | $CI_3$ | 4000 |
| $I_4$ | 5000 | $CI_1$ | 5000 |

As a result of the foregoing mapping, which reorders the original instructions $I_0$, $I_1$, $I_2$, $I_3$ and $I_4$ to candidate instructions $CI_4$, $CI_0$, $CI_2$, $CI_3$ and $CI_1$, respectively, the regrouped set of candidate instructions have the following values: $CI_0$=2000; $CI_1$=5000; $CI_2$=3000; $CI_3$=4000; and $CI_4$=1000.

As may now be seen, the grouped candidate instructions have now been reordered so that they contain a first stop-loss signature annotation therein. As a result, therefore, when the processor core 106 processes the grouped candidate instructions using a signature detection algorithm configured to detect a first stop-loss signature, the processor core 106 recognizes the last candidate instruction $CI_4$ as the first instruction $I_0$ because val($CI_4$) is less than val($CI_0$). More specifically, val($CI_0$) is 2000, val($CI_1$) through val($CI_3$) are all greater than 2000 and val($CI_4$) is 1000. In this regard, it should be noted that the order among the candidate instructions $CI_1$, $CI_2$ and $CI_3$ is unimportant since, regardless of the mapping of these instructions, the signature detection algorithm will still identify the first-stop-loss signature appended to the grouped instructions.

In another embodiment, the signature annotation algorithm executed by the grouping tool 102 may be configured such that it will annotate each group with a last stop-loss signature. As before, an input stream of assembly instructions are fetched, retrieved or otherwise received by the grouping tool 102. Again, by executing a signature annotation algorithm which exploits permissible flexibility in ordering the instructions, the grouping tool 102 is able to add information identifying groupings of instructions within an instruction stream to the instruction stream without adding to the length of the instruction stream itself. Here, however, the signature annotated to each group by the signature annotation algorithm executed by the grouping tool 102 is a last stop-loss signature. Generally, if the value (val) of a candidate instruction (CI) is X when the instruction is interpreted as an unsigned integer, a last stop-loss signature will reorder an n-instruction group such that: (1) the value of each candidate instruction $CI_0$ through $CI_{n-2}$ is less than or equal to the value of the next candidate instruction; and (2) the value of the last candidate instruction $CI_{n-1}$ is less than the prior candidate instruction $CI_{n-2}$. Thus, in a group of candidate instructions reordered in accordance with a last stop-loss type signature annotation algorithm, the first loss in the value of between successive candidate instructions occurs between the next-to-last and last instructions. In other words, the rule governing the last stop-loss type signature annotation algorithm may be represented by the following expression:

$$\mathrm{val}(CI_0) >= \mathrm{val}(CI_1) >= \ldots >= \mathrm{val}(CI_{n-2}) > \mathrm{val}(CI_{n-1})$$

As before, after a group of instructions are reordered by the signature annotation algorithm, the candidate instructions are passed from the grouping tool 102 to the processor core 106 for subsequent processing. Again, the processor core 106 applies a signature detection algorithm which will enable the processor core 106 to identify which instructions are included in a particular group of candidate instructions. Of course, the precise signature detection algorithm executed by the processor core 106 will vary depending on the type of signature annotated onto each group of candidate instructions. For example, the signature detection algorithm to be used to detect groups of instructions will differ when a last stop-loss-type signature is annotated to each group than when a first stop loss-type signature is annotated to the groups.

The operation of the grouping tool 102 when executing a last stop-loss type signature annotation algorithm shall now be described in greater detail. In the foregoing example, the signature annotation algorithm executed by the grouping tool 102 shall reorder a group of five instructions having the following values: $I_0$=1000; $I_1$=2000; $I_2$=3000; $I_3$=4000; and $I_4$=5000. When executing the last stop-loss type signature annotation algorithm, the grouping tool 102 maps the initial group of five instructions in accordance with Table II below:

TABLE II

| Instruction No. | Value of Instruction | Candidate Instruction | Value of Candidate Instruction |
| --- | --- | --- | --- |
| $I_0$ | 1000 | $CI_0$ | 1000 |
| $I_1$ | 2000 | $CI_1$ | 2000 |
| $I_2$ | 3000 | $CI_4$ | 3000 |
| $I_3$ | 4000 | $CI_2$ | 4000 |
| $I_4$ | 5000 | $CI_3$ | 5000 |

As a result of the foregoing mapping, which reorders the original instructions $I_0$, $I_1$, $I_2$, $I_3$ and $I_4$ to candidate instructions $CI_0$, $CI_1$, $CI_4$, $CI_2$ and $CI_3$, respectively, the regrouped set of candidate instructions have the following values: $CI_0$=1000; $CI_1$=2000; $CI_2$=4000; $CI_3$=5000; and $CI_4$=3000.

As may now be seen, the grouped candidate instructions have now been reordered so that they contain a last stop-loss type signature annotation therein. As a result, therefore, when the processor core 106 processes grouped candidate instructions using the signature detection algorithm configured to detect a last stop-loss type signature, the processor core 106 recognizes the last candidate instruction $CI_3$ as a border of the group because the value of $CI_3$ is less than the value of $CI_2$. More specifically, as previously set forth, in a last stop-loss-type signature annotation, the last candidate instruction of the initial group of five instructions is identified as the first candidate instruction having a value less than its predecessor candidate instruction. In the above example, candidate instruction $CI_4$ has a value of 3000 while the predecessor candidate instruction $CI_3$ has a value of 5000. As $CI_4$ is the first candidate instruction with a value less than its predecessor candidate instruction, the signature detection algorithm identifies $CI_4$ as the last candidate instruction within the group.

Like the first stop-loss-type algorithm, it should again be noted a certain degree of flexibility is possible when mapping the instructions $I_0$ through $I_4$ to the candidate instructions $CI_0$ through $CI_4$ using a last stop-loss-type algorithm. More specifically, because any one of $I_0$, $I_1$, $I_2$ and $I_3$ are less than $I_4$, any one of these instructions could have been mapped to $CI_4$ and the signature detection algorithm would still have successfully identified the end of the group of instructions. It should also be noted that a wide variety of other signature annotation and signature detection algorithms may be implemented in accordance with the teachings of the present invention. For example, the signature annotation algorithm executed by the grouping tool 102 may reorder every group with a first stop-gain signature annotation algorithm or a last stop-gain signature annotation algorithm. Of course, the processor core 106 would execute a corresponding signature detection algorithm, specifically, a first stop-gain signature detection algorithm or a last stop-gain signature detection algorithm. Of course, it should be clearly understood that the foregoing are but a few of the many suitable signature annotation and signature detection algorithms which may be executed by the grouping tool 102 and the processor core 106, respectively.

In the embodiment of FIG. 1, the processor core 106 implements a load-store architecture. That is, the signature instruction stream includes load instructions used to transfer data from the memory system 108 to registers of the processor core 106, and store instructions used to transfer data from the registers of the processor core 106 to the memory system 108. Instructions other than the load and store instructions specify register operands, and register-to-register operations. In this manner, the register-to-register operations are decoupled from accesses to the memory system 108. The memory system 108 may include, for example, volatile memory structures (e.g., dynamic random access memory structures, static random access memory structures, etc.) and/or non-volatile memory structures (read only memory structures, electrically erasable programmable read only memory structures, flash memory structures, etc.). Of course, the foregoing is but one suitable example of the implementation of the processor core 106 and the memory system 108 and it is fully contemplated that a variety of other configurations are equally suitable for the purposes disclosed herein.

Figure 2:
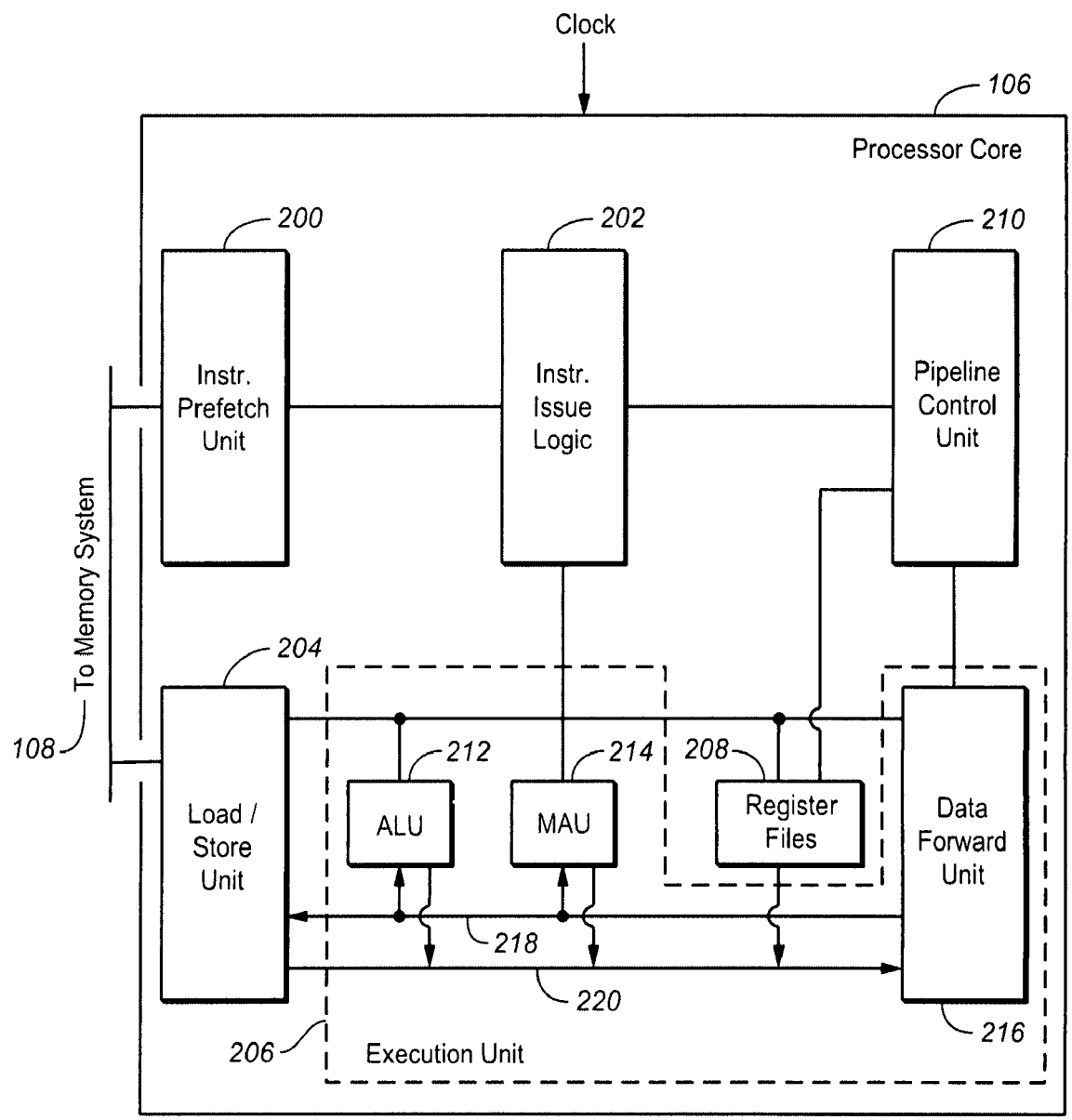
FIG. 2 is a block diagram of one embodiment of the processor core of FIG. 1.

Referring next to FIG. 2, the processor core 106 of FIG. 1 will now be described in greater detail. Of course, it is fully contemplated that the present invention is suitable for use with a wide variety of other types of processing systems. In the embodiment illustrated in FIG. 2, the processor core 106 is a pipelined superscalar processor core which includes an instruction prefetch unit 200, instruction issue logic 202, a load/store unit 204, an execution unit 206, a unified register file 208, and a pipeline control unit 210. The instruction prefetch unit 200 fetches an instruction stream from the memory system of FIG. 1 and provides the fetched instructions to the instruction issue logic 202. As previously set forth, the instruction stream is comprised of one or more groups of candidate instructions, each having a signature annotated thereto. In one embodiment, the instruction prefetch unit 200 is capable of fetching up to 8 instructions at a time from the memory system 108, and stores the candidate instructions in an instruction cache within the instruction prefetch unit 200.

The instruction issue logic 202 receives the stream of candidate instructions from the instruction cache of the instruction prefetch unit 200. The instruction issue logic 202 is capable of receiving or retrieving n instructions (where n>1) of the stream of candidate instructions from the instruction cache within the instruction prefetch unit 200 of FIG. 2 during a single cycle of the CLOCK signal. After receiving or otherwise retrieving the n instructions of the stream of candidate instructions in a first CLOCK cycle, the instruction issue logic 202 will concurrently decode the n retrieved instructions and execute the signature detection algorithm described herein; in a next cycle of the CLOCK signal. As it executes, the signature detection algorithm examines each instruction of the n instructions in sequence, periodically detecting boundaries between groups of instructions. Once successive boundaries are detected in the stream of candidate instructions, the signature detection algorithm will have identified, from the stream of candidate instructions, a group of instructions. Once a group of candidate instructions are identified, the instruction issue logic 202 stores the identified group of instructions in an instruction queue. The instruction issue logic 202 then issues the group of instructions as appropriate.

The load/store unit 204 is used to transfer data between the processor core 106 and the memory system 108 as described above. In the embodiment of FIG. 2, the load/store unit 204 includes 2 independent load/store units. The execution unit 206 is used to perform operations specified by candidate instructions (and corresponding decoded instructions). In the embodiment of FIG. 2, the execution unit 206 includes an arithmetic logic unit (ALU) 212, a multiply-accumulate unit (MAU) 214, and a data forwarding unit 216. In one embodiment of FIG. 2, the ALU 212 includes 2 independent ALUs, and the MAU 214 includes 2 independent MAUs. In the embodiment of FIG. 2, the ALU 212 and the MAU 214 receive operands from the instructions issue logic 202, the unified register file 208, and/or the data forwarding unit 216.

The instruction issue logic 202 issues one or more decoded instructions to the load/store unit 204, the ALU 212, and/or the MAU 214 via an instruction source bus 218. The data forwarding unit 216 is also coupled to the instruction source bus 218, and also receives the decoded instruction information via the instruction source bus 218. Results produced by the ALU 212 and the MAU 214 are provided to the data forwarding unit 216 via destination bus 220. The unified register file 208 includes multiple registers of the processor core 106. In general, unified register file 208 is used to store data values, and is used to store address values relating to addresses of memory locations in the memory system 108 of FIG. 1. In general, the pipeline control unit 210 controls the instruction execution pipeline and provides read and write enable signals to the unified register file 208. In one embodiment, prior to issuing the one or more decoded instructions, the instruction issue logic 202 will determine what resources within the execution unit 206 are required to execute the one or more decoded instructions (e.g., the ALU 212, the MAU 214, etc.). The instruction issue logic 202 also queues the instructions for execution by the appropriate resources of the execution unit 206.

Figure 3:
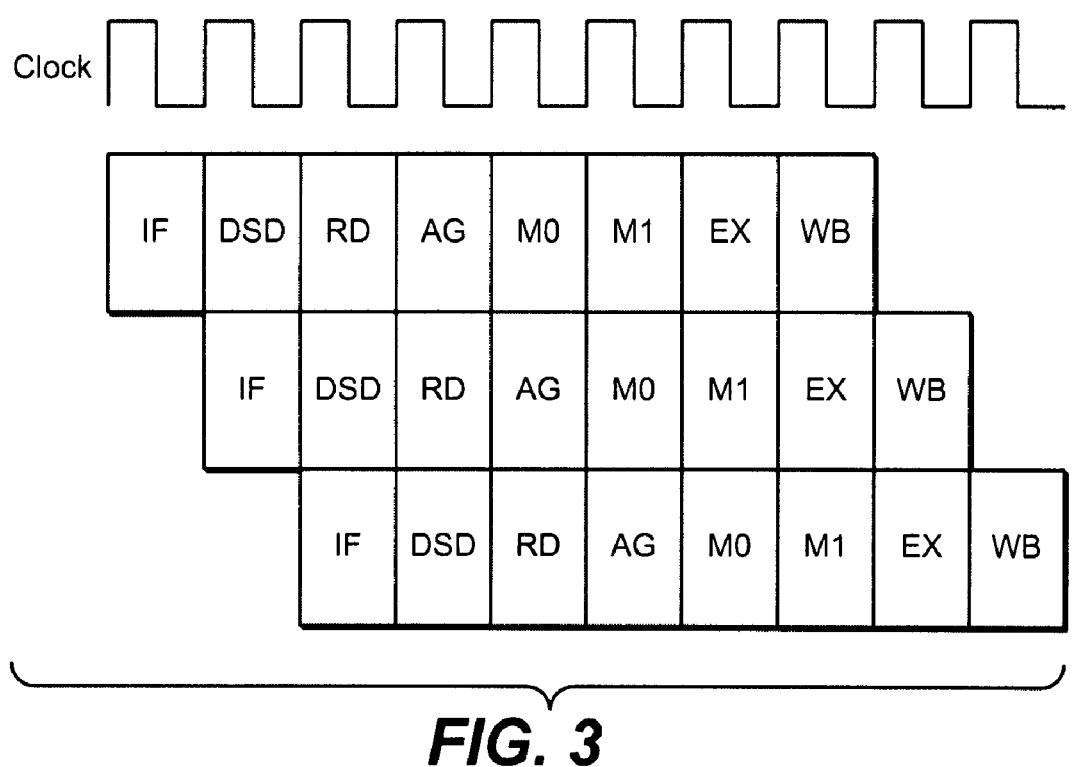
FIG. 3 is a diagram illustrating an instruction execution pipeline implemented within the processor core of FIG. 2.

FIG. 3 is a diagram illustrating the instruction execution pipeline implemented within the processor core 106 of FIG. 2. The instruction execution pipeline (pipeline) allows overlapped execution of multiple instructions. In the embodiment illustrated in FIG. 3, the pipeline includes 8 stages: a instruction fetch (IF) pipeline stage, a decode/signature detection (SDD) pipeline stage, an operand read (RD) pipeline stage, an address generation (AG) pipeline stage, a memory access 0 (M0) pipeline stage, a memory pipeline access 1 (M1) pipeline stage, an execution (EX) pipeline stage, and a write back (WB) pipeline stage. As indicated in FIG. 3, operations in each of the 8 pipeline stages are respectively completed during a single cycle of the CLOCK signal.

Referring to FIGS. 1 and 2, the instruction prefetch unit 200 fetches several candidate instructions (e.g., up to 8 instructions) from the memory system 108 of FIG. 1 during the instruction fetch pipeline stage. The instruction prefetch unit 200 of FIG. 2 aligns the signature annotated candidate instruction stream, and provides the signature annotated candidate instruction stream to the instruction issue logic 202. The instruction issue logic 202 fully decodes the candidate instructions and stores the fully decoded instructions in an instruction queue. The instruction issue logic 202 also translates the opcodes into native opcodes for the processor.

During the Decode/Signature Detection (DSD) pipeline stage, the instruction issue logic 202 concurrently decodes and examines the fetched instructions, periodically detecting boundaries between groups of instructions. Once successive boundaries are detected in the stream of candidate instructions, the signature detection algorithm will have identified, from the stream of candidate instructions, a group of instructions. As previously set forth, the instruction issue logic 202 detects boundaries between groups of instructions by executing the signature detection algorithm which, as also previously set forth, will vary depending on the particular type of signature, for example, a first stop-loss signature or a last stop-loss signature, that the grouping tool 102 had annotated onto the group of instructions. It should be noted that both the first stop-loss signature detection algorithm and the last stop-loss signature detection algorithms are configured to detect the last instruction in a group. Accordingly, the first instruction to arrive at the instruction issue logic 202 is the first instruction of a first group of instructions. The subsequent detection of a group boundary identifies the last instruction of the first group of instructions and the first instruction of a next group of instructions.

In one embodiment of FIG. 3, the instruction issue logic 202 passes one or more of the decoded instructions identified as forming a group of instructions on to the read operand (RD) stage as a group. During the read operand (RD) stage, any operand values, and/or values needed for operand address generation, for the group of decoded instructions are obtained from the unified register file 208. During the address generation (AG) stage, any values needed for operand address generation are provided to the load/store unit 204, in one embodiment of FIG. 3 the load/store unit 204 generates internal addresses of any operands located in the memory system 108 of FIG. 1. During the memory address 0 (M0) stage, the load/store unit 204 translates the internal addresses to external memory addresses used within the memory system 108 of FIG. 1. During the memory address 1 (M1) stage, the load/store unit 204 uses the external memory addresses to obtain any operands located in the memory system 108 of FIG. 1. During the execution (EX) stage, the execution unit 206 uses the operands to perform operations specified by the one or more instructions of the group. During a final portion of the execution (EX) stage, valid results (including qualified results of any conditionally executed instructions) are stored in registers of the unified register file 208. During the write back (WB) stage, valid results (including qualified results of any conditionally executed instructions) of store instructions, used to store data in the memory system 108 of FIG. 1 as described above, are provided to the load/store unit 204. Such store instructions are typically used to copy values stored in registers of the unified register file 208 to memory locations of the memory system 108.

Figure 4:
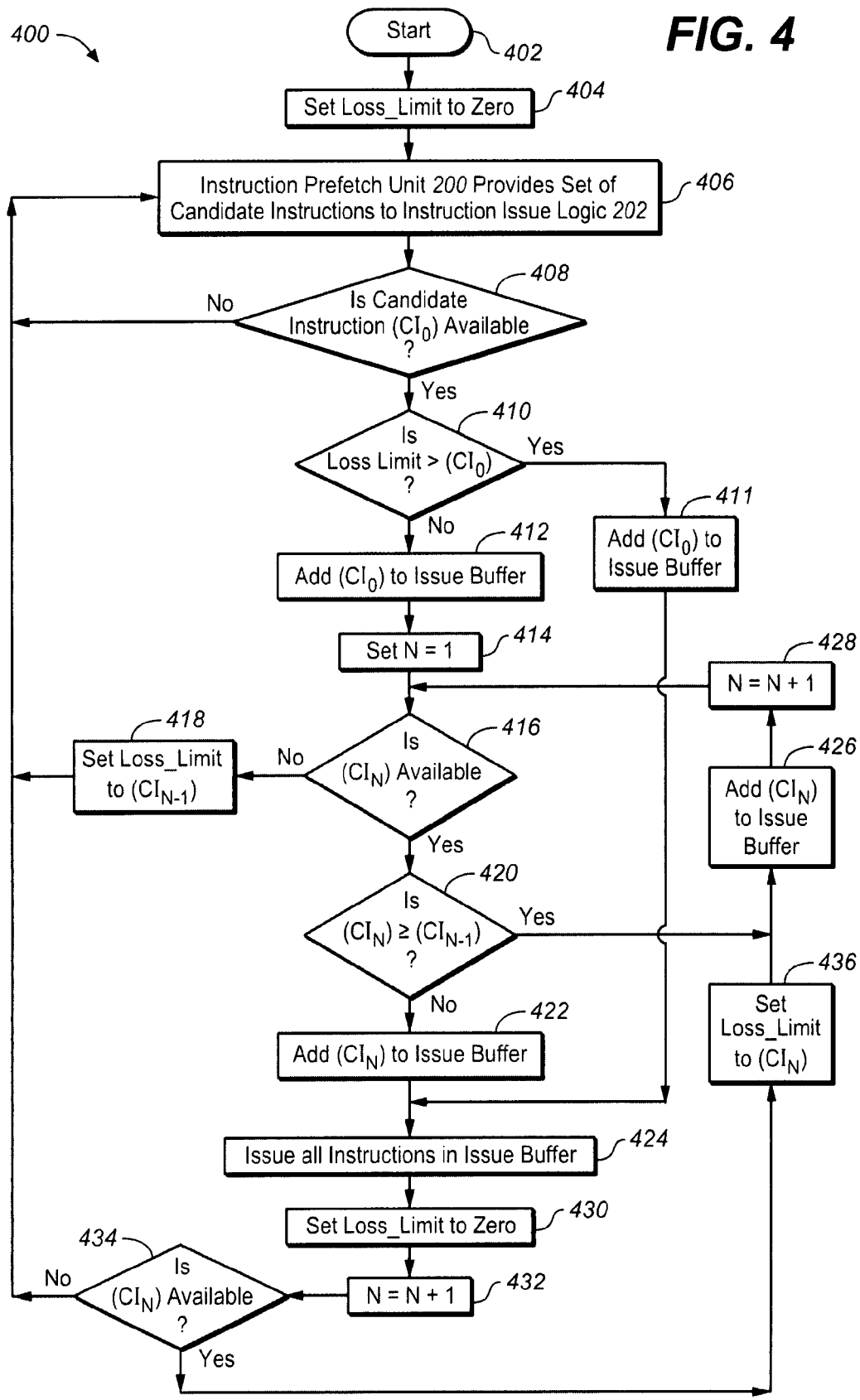
FIG. 4 is a flow chart of one embodiment of a first portion of a process for executing instructions, specifically, that portion of the process by which groups of decoded instructions are identified, within the processor core of FIG. 2.

FIG. 4 is a flow chart of one embodiment of a first portion of a process for executing instructions, specifically, that portion of the process by which groups of instructions are identified, by an exemplary superscalar processor, for example, the processor core 106 of FIG. 1. More specifically, the instruction issue logic 202 of FIG. 2 identifies groups of instructions by executing a signature detection algorithm which will vary depending on the particular type of signature being annotated onto the groups by the grouping tool 102. While, as disclosed herein, the signature detection algorithm is executed concurrently with decoding of the instructions, it should be clearly understood, however, that the signature detection algorithm need not be executed concurrently with decoding of the instructions. Rather, it is fully contemplated that the decoding process may take place at any time relative to the execution of the signature detection algorithm. Furthermore, in the embodiment hereinbelow described, a signature detection algorithm configured to identify groups of instructions having a last stop-loss signature annotated thereto is set forth in great detail. However, as previously set forth, it is fully contemplated that the signature detection algorithm described herein may be modified to recognize various other types of signatures, for example, a first stop-gain signature or a last stop-gain signature, which may be annotated onto groups of instructions and that the foregoing description of the method by which a first stop-loss signature is detected is disclosed purely by way of example.

The signature detection algorithm 400 commences at step 402 and, at step 404, the value of parameter LOSS_LIMIT is set to zero. As will be more fully described below, LOSS_LIMIT is used by the signature execution algorithm to identify those groups of instructions which extend between sets of instructions provided to the instruction issue logic 202 by the instruction prefetch unit 200. Proceeding on to step 406, the instruction issue logic 202 awaits the arrival of a set of n candidate instructions from the instruction prefetch unit 200. It is fully contemplated that an arriving set of candidate instructions may include all or part of one or more groups of instructions. However, when the set of candidate instructions provided to the instruction issue logic 202 is the first set of candidate instructions provided thereto, it will be presumed that the first instruction of the set of candidate instructions is a first instruction in a group of instructions.

At step 408, the signature detection algorithm checks to see if a first candidate instruction ($CI_0$) of a set of candidate instructions provided to the instruction issue logic 202 is available for examination. If the first candidate instruction ($CI_0$) is not available for examination, the signature detection algorithm will conclude that the set of candidate instructions has not yet arrived. The process 400 will then return to step 406 to continue awaiting the arrival of a set of candidate instructions. The process 400 will stay in the loop between steps 406 and 408 until the instruction prefetch unit 200 provides a set of candidate instructions to the instruction issue logic 202. When the set of candidate instructions arrives, the signature detection algorithm will determine at step 408 that a first candidate instruction ($CI_0$) is available for examination. The method will then proceed to step 410 where signature detection algorithm will determine if the candidate instruction ($CI_0$) is the last candidate instruction in a group of candidate instructions by comparing the value of the candidate instruction val($CI_0$) to the value of LOSS_LIMIT.

Of course, regardless of whether the value of the candidate instruction ($CI_0$) is greater or less than the value of LOSS_LIMIT, the candidate instruction ($CI_0$) will be added to a buffer, hereafter referred to as the issue buffer, from which identified groups of instructions are issued. This result occurs because the first candidate instruction in a received set of candidate instructions will always be part of the current group of instructions being identified. In the initial iteration of the signature detection algorithm, LOSS_LIMIT was previously set to zero. Thus, in the initial iteration of the signature detection algorithm, it will be determined at step 410 that the value of the candidate instruction ($CI_0$) is greater than LOSS_LIMIT. Upon determining that LOSS_LIMIT is greater than the value of ($CI_0$), the signature detection algorithm will conclude that the candidate instruction ($CI_0$) is not the last candidate instruction of a group of instructions. Accordingly, the process will proceed to step 412 for further processing in the manner to be more fully described below. In subsequent iterations of the signature detection algorithm in which a group of candidate instructions extends over multiple sets of candidate instructions, the candidate instruction ($CI_0$), which will be the first candidate instruction of a next set of instructions, will again be compared to the value of LOSS_LIMIT. In these iterations, however, LOSS_LIMIT will be set to the value of the last candidate instruction of the prior set of candidate instructions. As a result, so long as the first candidate instruction ($CI_0$) of a set of received candidate instructions is not also the last candidate instruction of a group of candidate instructions, in each iteration, the method will proceed to step 412 for further processing in the manner to be more fully described below. If, however, it is determined at step 410 that the value of LOSS_LIMIT is greater than the value of the candidate instruction ($CI_0$), then the signature detection algorithm will have determined that the candidate instruction ($CI_0$) is the last candidate instruction of a group of candidate instructions. The method will then proceed to step 411 where the candidate instruction ($CI_0$) is added to the issued buffer.

Returning to step 410, upon determining that LOSS_LIMIT is less than the value of ($CI_0$), the signature detection algorithm concludes that the candidate instruction ($CI_0$) is not the last candidate instruction of a group of candidate instructions. Accordingly, the method proceeds to step 412 where the candidate instruction ($CI_0$) is added to the issue buffer. Continuing on to step 414, the value of N, a counter used to identify the candidate instruction being evaluated, is set to 1 and, at step 416, the signature detection algorithm checks to see if the next candidate instruction ($CI_n$) is a available for examination. If it is determined at step 416 that the next sequential candidate instruction ($CI_n$) is not available for examination, the signature detection algorithm will determine that all of the candidate instructions of the set of candidate instructions have been examined. The method will then proceed to step 418 where the value of LOSS_LIMIT is set to ($CI_{n-1}$), the last candidate instruction of the received set of candidate instructions being examined. In the current iteration of the disclosed method, the value of LOSS_LIMIT would be set to ($CI_0$). The method would then return to step 406 to await arrival of a next set of candidate instructions in the manner previously described.

If, however, it is determined at step 416 that the next candidate instruction ($CI_n$) is available, the method will instead proceed to step 420 where the value of the candidate instruction ($CI_n$) is compared to the value of the prior candidate instruction ($CI_{n-1}$). If the value of the current candidate instruction ($CI_n$) is greater than or equal to the value of the immediately previous candidate instruction ($CI_{n-1}$), the signature detection algorithm determines that a boundary between successive groups of candidate instructions has not been detected and that additional candidate instructions must be examined to identify the boundary. Accordingly, the method proceeds to step 426 where the current candidate instruction ($CI_n$) is added to the issue buffer. After adding the current candidate instruction ($CI_n$) to the issue buffer, the method proceeds to step 428 where the value of N is incremented by one and then returns to step 416 for determination, in the manner previously described, if a next candidate instruction in the received set of candidate instructions is available.

Returning to step 420, if, however, it is determined at step 420 that the value of the previous candidate instruction ($CI_{n-1}$) is less than the value of the current candidate instruction ($CI_n$), the signature detection algorithm will have identified a boundary between successive groups of candidate instructions and have determined that the candidate instruction ($CI_n$) is the last candidate instruction in the group of candidate instructions. The process will then proceed to step 422 where the candidate instruction ($CI_n$) is added to the issue buffer. Upon adding the last candidate instruction of an identified group of candidate instructions to the issue buffer at either step 411 or at step 422, the issue buffer now holds a group of candidate instructions. Accordingly, the method may now proceed to step 424 where all of the candidate instructions held in the issue buffer are issued.

Having issued a group of candidate instructions at step 424, the method will proceed to step 430 where the value of LOSS_LIMIT is reset to zero. As previously discussed, however, the boundary between successive groups of candidate instructions may either be at the end or in the middle of a set of received candidate instructions. To address those scenarios where the received set of candidate instructions may contain candidate instructions from plural groups, the method will now proceed to step 432 where the value of N is incremented by one. The method then proceeds to step 434 where the signature detection algorithm again checks to see if the next candidate instruction ($CI_n$) is available for examination. If it is determined at step 434 that the next sequential candidate instruction ($CI_n$) is not available for examination, the signature detection algorithm will determine that the boundary between successive groups of candidate instructions coincides with the end of the received set of instructions and that all of the candidate instructions of the received set of candidate instructions have been examined. The method would then return to step 406 to await arrival of a next set of candidate instructions in the manner previously described. If, however, it is determined at step 434 that the next candidate instruction ($CI_n$) is available, the signature detection algorithm will determine that the boundary between successive groups of candidate instructions is in the middle of the received set of candidate instructions. Accordingly, the method will instead proceed to step 436 where the value of LOSS_LIMIT is set to the value of the candidate instruction ($CI_n$). The method will then proceed to step 426 where the current candidate instruction ($CI_n$) (now determined to be the first candidate instruction of the next group of candidate instructions) is placed in the, now empty, issue buffer. After adding the current candidate instruction ($CI_n$) to the issue buffer at step 426, the method then proceeds to step 428 for further processing of the received set of candidate instructions in the manner previously set forth.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A data processing system, comprising:
  a grouping tool for arranging a stream of instructions into a stream of grouped instructions which includes at least two instructions, said grouping tool including a signature annotation algorithm for annotating each group of instructions forming part of said stream of grouped instructions with a dimensionless signature which indicates an end to said group of instructions, said signature annotation algorithm annotating each group of instructions by reordering instructions forming each group of instructions contained in said stream of grouped instructions and said dimensionless signature comprised of the reordering of said instructions contained in said group of instructions; and
  a hardware processor, coupled to said grouping tool, for receiving said stream of grouped instructions and implementing an execution pipeline using said stream of grouped instructions received from said grouping tool, said hardware processor including a signature detection algorithm for identifying said dimensionless signatures which indicate the ends to said groups of instructions forming part of said stream of grouped instructions, said signature detection algorithm identifying each said group of instructions contained in said stream of grouped instructions by identifying a selected one of said reordered instructions in each said group of instructions;
  wherein said signature annotation algorithm reorders instructions forming each said group of instructions contained in said stream of grouped instructions to include a first stop-loss signature and wherein a group of instructions has a first stop-loss signature when a first instruction of said group of instructions has a first value, a last instruction of said group of instructions has a second value less than said first value and all instructions between said first instruction and said last instruction have values greater than said first value.

2. The data processing system of claim 1, wherein said grouping tool is implemented in software external to said processor.

3. The data processing system of claim 2, wherein said grouping tool resides in an assembler coupled to said processor.

4. The data processing system of claim 1, wherein said processor further comprises:
  means for identifying groups of instructions within said stream of grouped instructions; and
  means for executing said identified groups of instructions.

5. The data processing system of claim 4, wherein said means for identifying groups of instructions within said stream of grouped instructions is implemented in hardware residing within said processor.

6. The data processing system of claim 5, wherein said grouping tool is implemented in software external to said processor.

7. The data processing system of claim 6, wherein said grouping tool resides in an assembler coupled to said processor.

8. The data processing system of claim 1, wherein said processor resides on a system-on-a-chip (SOC) and wherein said SOC further comprises a memory coupled to said processor.

9. The data processing system of claim 8, wherein said grouping tool passes said stream of grouped instructions to said SOC and wherein said SOC stores said stream of grouped instructions received from said grouping tool in said memory.

10. The data processing system of claim 9, wherein said processor further comprises:
   an instruction prefetch unit for fetching said stream of grouped instructions from said memory; and
   an instruction issue logic unit, coupled to said instruction prefetch unit, said instruction issue logic unit configured to identify said at least two instructions contained in said stream of grouped instructions.

11. The data processing system of claim 1, wherein said signature detection algorithm identifies said first stop-loss signature in each said group of instructions contained in said stream of grouped instructions.

12. The data processing system of claim 1, wherein the processor further comprises a pipelined superscalar processor core capable of concurrently executing multiple instructions in the same or different pipeline stages.

13. The data processing system of claim 12, wherein said grouping tool is implemented in software external to said processor.

14. The data processing system of claim 13, wherein said grouping tool resides in an assembler coupled to said processor.

15. The data processing system of claim 12, wherein said processor resides on a system-on-a-chip (SOC) and wherein said SOC further comprises a memory coupled to said processor.

16. The data processing system of claim 15, wherein said grouping tool is implemented in software external to said processor.

17. The data processing system of claim 16, wherein said grouping tool resides in an assembler coupled to said processor.

18. The data processing system of claim 15, wherein said grouping tool passes said stream of grouped instructions to said SOC and wherein said SOC stores said stream of grouped instructions received from said grouping tool in said memory.

19. The data processing system of claim 18, wherein said pipelined superscalar processor core further comprises:
   an instruction prefetch unit for fetching said stream of grouped instructions from said memory and placing said fetched stream of grouped instructions in an instruction cache; and
   an instruction issue logic unit, coupled to said instruction prefetch unit, said instruction issue logic unit configured to identify said at least two instructions contained in said stream of grouped instructions.

20. The data processing system of claim 19, wherein said instruction issue logic unit is capable of receiving a set of up to eight instructions from said instruction cache and placing each one of said set of up to eight instructions identified as forming part of a first group of instructions together in an instruction queue.

21. The data processing system of claim 20, wherein said instruction issue logic unit identifies boundaries between successive groups of instructions based upon comparisons of the value of each instruction with the value of a next instruction.

22. A data processing system, comprising:
   a grouping tool for arranging a stream of instructions into a stream of grouped instructions which includes at least two instructions, said grouping tool including a signature annotation algorithm for annotating each group of instructions forming part of said stream of grouped instructions with a dimensionless signature which indicates an end to said group of instructions, said signature annotation algorithm annotating each group of instructions by reordering instructions forming each group of instructions contained in said stream of grouped instructions and said dimensionless signature comprised of the reordering of said instructions contained in said group of instructions; and
   a hardware processor, coupled to said grouping tool, for receiving said stream of grouped instructions and implementing an execution pipeline using said stream of grouped instructions received from said grouping tool, said hardware processor including a signature detection algorithm for identifying said dimensionless signatures which indicate the ends to said groups of instructions forming part of said stream of grouped instructions, said signature detection algorithm identifying each said group of instructions contained in said stream of grouped instructions by identifying a selected one of said reordered instructions in each said group of instructions;
   wherein said signature annotation algorithm reorders instructions forming each said group of instructions contained in said stream of grouped instructions to include a last stop-loss signature and wherein a group of instructions has a last stop-loss signature when a last instruction of said group of instructions is the first to have a value less than the value of an instruction immediately preceding said last instruction.

23. The data processing system of claim 22, wherein said signature detection algorithm identifies said last stop-loss signature in each said group of instructions contained in said stream of grouped instructions.

24. The data processing system of claim 22, wherein said grouping tool is implemented in software external to said processor.

25. The data processing system of claim 24, wherein said grouping tool resides in an assembler coupled to said processor.

26. The data processing system of claim 22 wherein said processor further comprises:
   means for identifying groups of instructions within said stream of grouped instructions; and
   means for executing said identified groups of instructions.

27. The data processing system of claim 26, wherein said means for identifying groups of instructions within said stream of grouped instructions is implemented in hardware residing within said processor.

28. The data processing system of claim 27, wherein said grouping tool is implemented in software external to said processor.

29. The data processing system of claim 28, wherein said grouping tool resides in an assembler coupled to said processor.

30. The data processing system of claim 22, wherein said processor resides on a system-on-a-chip (SOC) and wherein said SOC further comprises a memory coupled to said processor.

31. The data processing system of claim 30, wherein said grouping tool passes said stream of grouped instructions to said SOC and wherein said SOC stores said stream of grouped instructions received from said grouping tool in said memory.

32. The data processing system of claim 31, wherein said processor further comprises;
   an instruction prefetch unit for fetching said stream of grouped instructions from said memory; and
   an instruction issue logic unit, coupled to said instruction prefetch unit, said instruction issue logic unit configured to identify said at least two instructions contained in said stream of grouped instructions.

33. The data processing system of claim 22, wherein the processor further comprises a pipelined superscalar processor core capable of concurrently executing multiple instructions in the same or different pipeline stages.

34. The data processing system of claim 33, wherein said grouping tool is implemented in software external to said processor.

35. The data processing system of claim 34, wherein said grouping tool resides in an assembler coupled to said processor.

36. The data processing system of claim 33, wherein said processor resides on a system-on-a-chip (SOC) and wherein said SOC further comprises a memory coupled to said processor.

37. The data processing system of claim 36, wherein said grouping tool is implemented in software external to said processor.

38. The data processing system of claim 37, wherein said grouping tool resides in an assembler coupled to said processor.

39. The data processing system of claim 36, wherein said grouping tool passes said stream of grouped instructions to said SOC and wherein said SOC stores said stream of grouped instructions received from said grouping tool in said memory.

40. The data processing system of claim 39, wherein said pipelined superscalar processor core further comprises:
an instruction prefetch unit for fetching said stream of grouped instructions from said memory and placing said fetched stream of grouped instructions in an instruction cache; and
an instruction issue logic unit, coupled to said instruction prefetch unit, said instruction issue logic unit configured to identify said at least two instructions contained in said stream of grouped instructions.

41. The data processing system of claim 40, wherein said instruction issue logic unit is capable of receiving a set of up to eight instructions from said instruction cache and placing each one of said set of up to eight instructions identified as forming part of a first group of instructions together in an instruction queue.

42. The data processing system of claim 41, wherein said instruction issue logic unit identifies boundaries between successive groups of instructions based upon comparisons of the value of each instruction with the value of a next instruction.

43. A hardware processor, comprising:
an instruction prefetch unit capable of fetching an instruction stream from a memory in the hardware processor, said instruction stream containing instructions arranged in groups; and
an instruction issue logic unit configured to identify said groups of instructions contained in said instruction stream and to store said identified groups of instructions in an instruction queue;
said instruction stream fetched by said instruction prefetch unit containing, for each group of instructions thereof, a dimensionless signature which enables said instruction issue logic unit to identify said groups of instructions;
said dimensionless signature comprised of a recognizable reordering of said instructions contained in said groups of instructions;
said instruction issue logic unit configured to identify boundaries between first and second groups of instructions by comparing instruction values for one or more pairs of instructions of said first group of instructions; and
said comparison of instruction values for a last pair of instructions in said first group of instructions indicates a first stop-loss condition in which a first instruction of said first group of instructions has a first value, a last instruction of said first group of instructions has a second value less than said first value and all instructions of said first group of instructions that are between said first instruction and said last instruction have values greater than said first value.

44. The processor of claim 43, wherein the processor comprises a pipelined superscalar processor core capable of concurrently executing multiple instructions in the same or different pipeline stages.

45. A hardware processor, comprising:
an instruction prefetch unit capable of fetching an instruction stream from a memory in the hardware processor, said instruction stream containing instructions arranged in groups; and
an instruction issue logic unit configured to identify said groups of instructions contained in said instruction stream and to store said identified groups of instructions in an instruction queue;
said instruction stream fetched by said instruction prefetch unit containing, for each group of instructions thereof, a dimensionless signature which enables said instruction issue logic unit to identify said groups of instructions;
said dimensionless signature comprised of a recognizable reordering of said instructions contained in said groups of instructions;
said instruction issue logic unit configured to identify boundaries between first and second groups of instructions by comparing instruction values for one or more pairs of instructions of said first group of instructions; and
said comparison of instruction values for a last pair of instructions in said first group of instructions indicates a last stop-loss condition in which a last instruction of said first group of instructions is the first to have a value less than the value of an intermediate instruction of said first group of instructions and wherein said intermediate instruction of said first group of instructions immediately precedes said last instruction of said first group of instructions.

46. The processor of claim 45, wherein the processor comprises a pipelined superscalar processor core capable of concurrently executing multiple instructions in the same or different pipeline stages.

47. A process for identifying groups of instructions within an instruction stream, comprising:
reordering each group of instructions within said instruction stream such that each said group of instructions within said instruction stream includes a predefined relationship between instructions thereof;
comparing the value of each instruction in said instruction stream with the value of a next instruction in said instruction stream;
detecting boundaries between groups of instructions wherever said comparing of the value of successive instructions indicates the presence of said predefined relationship;
identifying groups of instructions each one of said identified groups of instructions bounded by successively detected boundaries; and
storing each of said identified groups of instructions in a queue located within instruction issue logic of a processor core;
wherein said predefined relationship is a first stop-loss relationship in which a first instruction of said group of instructions has a first value, a last instruction of said group of instructions has a second value less than said first value and all instructions between said first instruction and said last instruction have values greater than said first value.

48. A process for identifying groups of instructions within an instruction stream, comprising:

reordering each group of instructions within said instruction stream such that each said group of instructions within said instruction stream includes a predefined relationship between instructions thereof;

comparing the value of each instruction in said instruction stream with the value of a next instruction in said instruction stream;

detecting boundaries between groups of instructions wherever said comparing of the value of successive instructions indicates the presence of said predefined relationship;

identifying groups of instructions, each one of said identified groups of instructions bounded by successively detected boundaries; and storing each of said identified groups of instructions in a queue located within instruction issue logic of a processor core;

wherein said predefined relationship is a last stop-loss relationship in which a last instruction of said group of instructions is the first to have a value less than the value of an instruction immediately preceding said last instruction.

* * * * *